Figure 1:
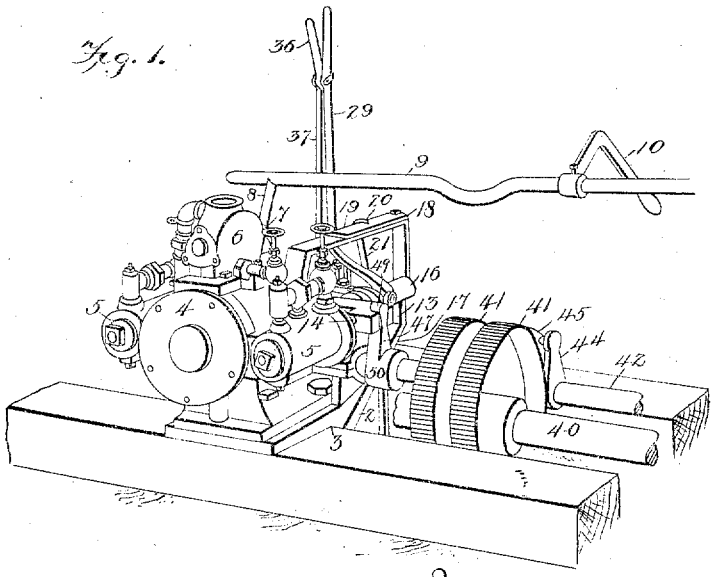

No. 11,732. Reissued Apr. 11, 1899.

M. CORRY & R. F. BARKER.

STEAM SET WORKS FOR SAWMILLS.

(Application filed Mar. 13, 1899.)

4 Sheets—Sheet 1.

Witnesses
T. L. Mountain
Ralph H. Warfield

Inventors:
Michael Corry
Reuben F. Barker
By Louis K. Gleason Attorney

No. 11,732.

Reissued Apr. 11, 1899.

M. CORRY & R. F. BARKER.

STEAM SET WORKS FOR SAWMILLS (Application filed Mar. 13, 1899.)

4 Sheets—Sheet 2.

Witnesses

F. L. Mockabee

Ralph Kirkfield

Inventors:

Michael Corry

Reuben F. Barker

By Louis K. Gillson Attorney

No. 11,732. Reissued Apr. 11, 1899.

M. CORRY & R. F. BARKER.

STEAM SET WORKS FOR SAWMILLS.

(Application filed Mar. 13, 1899.)

4 Sheets—Sheet 3

Witnesses

T. L. Mockabee

Ralph H. Warfield.

Inventors.

Michael Corry

Reuben F. Barker by Louis K. Gleason Attorney

No. 11,732. Reissued Apr. 11, 1899.

M. CORRY & R. F. BARKER.

STEAM SET WORKS FOR SAWMILLS.

(Application filed Mar. 13, 1899.)

4 Sheets—Sheet 4.

Witnesses
T. L. Mockabee
Ralph Warfield.

Inventors
Michael Corry
Robert F. Barker
By Louis C. Fraser Attorney

UNITED STATES PATENT OFFICE.

MICHAEL CORRY AND RUBEN F. BARKER, OF MARINETTE, WISCONSIN.

STEAM SET-WORKS FOR SAWMILLS.

SPECIFICATION forming part of Reissued Letters Patent No. 11,732, dated April 11, 1899.

Original No. 608,018, dated July 26, 1898. Application for reissue filed March 13, 1899. Serial No. 708,960.

*To all whom it may concern:*

Be it known that we, MICHAEL CORRY and RUBEN F. BARKER, citizens of the United States of America, residing at Marinette, in the county of Marinette and State of Wisconsin, have invented certain new and useful Improvements in Steam Set-Works for Sawmills; and we do declare the following to be a full, clear, and exact description of the invention, such as will enable others skilled in the art to which it appertains to make and use the same.

Our invention relates to improvements in hand-control steam-actuated set-works for sawmill-carriages; and the object is to provide a simple and effective device for accurately adjusting the set-works so as to cut boards of uniform thickness and of any desired thickness as well.

To this end the invention consists in the construction, combination, and arrangement of the device, as will be hereinafter more fully described, and particularly pointed out in the claims.

The accompanying drawings show our invention in the best form now known to us; but many changes in the details might be made within the skill of a good mechanic without departing from the spirit of our invention as set forth in the claims at the end of this specification.

The same reference characters indicate the same parts of the invention.

Figure 2:
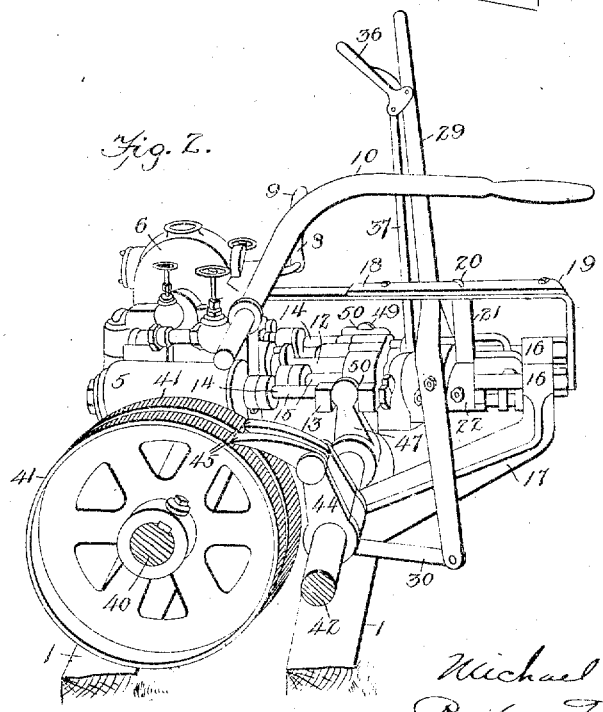
Figure 3:
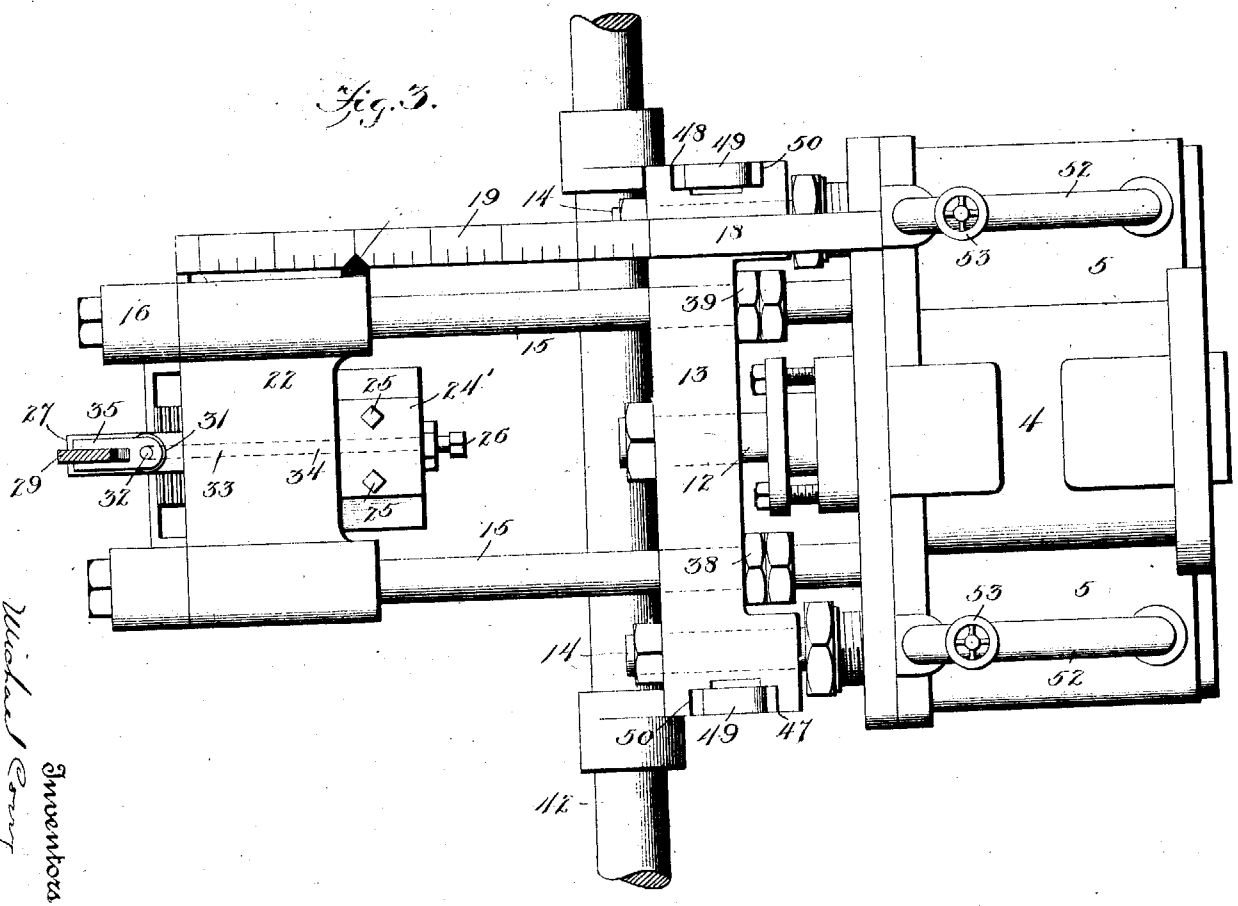
Figure 4:
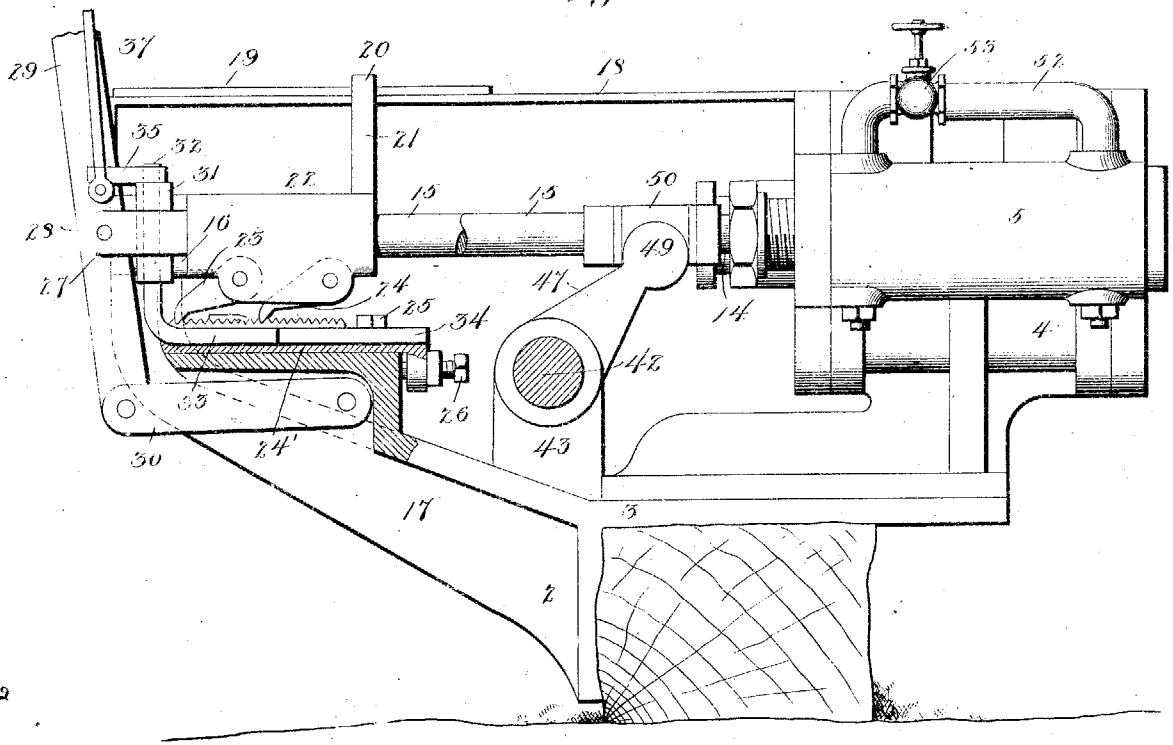
Figure 5:
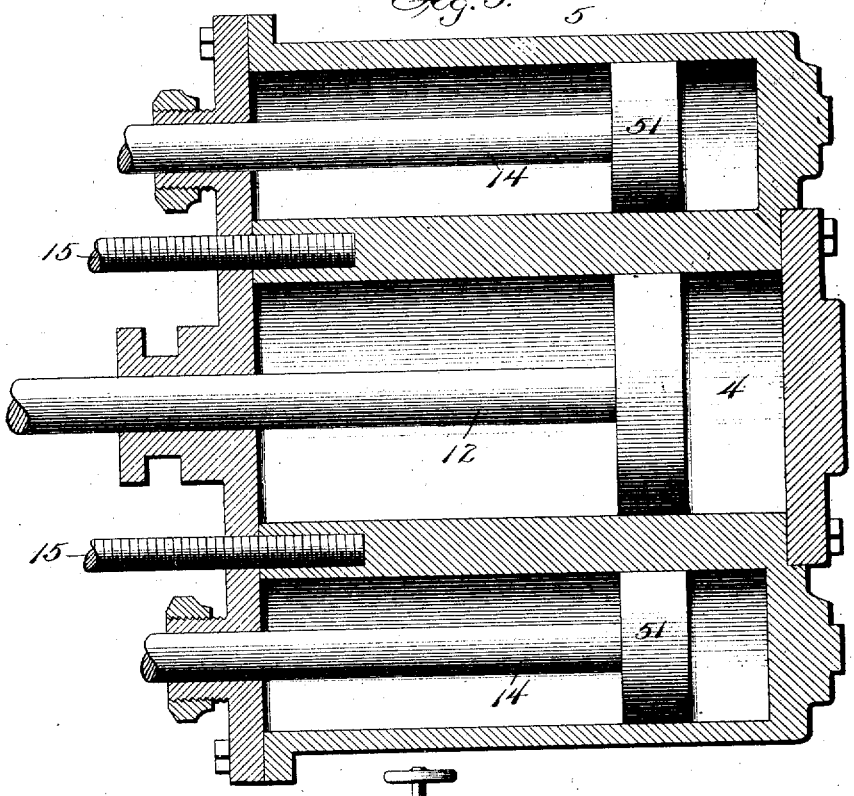
Figure 6:
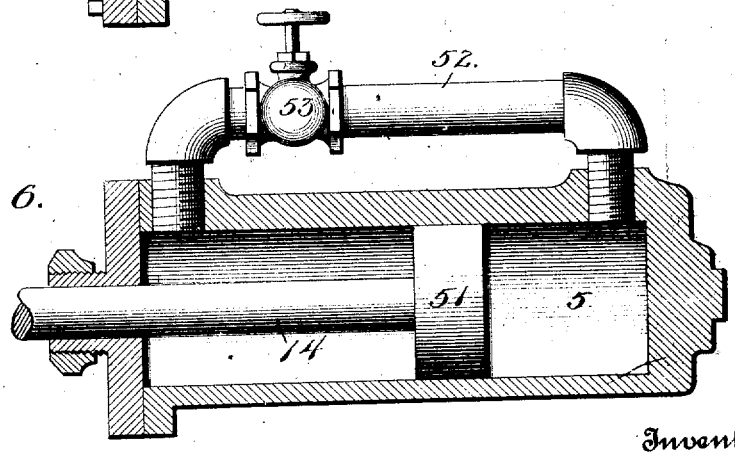

Figure 1 is a perspective view of our improved set-works. Fig. 2 is a similar view taken from the opposite side. Fig. 3 is a top plan view. Fig. 4 is a central transverse section. Fig. 5 is a horizontal section, and Fig. 6 is a longitudinal section through one of the oil-cylinders.

1 denotes the carriage-timber, and 2 a casting formed with an integral right-angular bracket 3, which is bolted to the timber.

4 represents the steam-cylinder, and 5 5 the oil-cylinders, arranged parallel with, in the same horizontal plane, and on opposite sides of the steam-cylinder.

6 represents the valve-chest of the steam-cylinder, and it is provided with the usual form of balanced piston-valve for controlling the live and exhaust steam.

7 denotes the valve-stem, and its outer end is pivoted to the lower end of a depending arm 8, fixed to the longitudinal shaft 9, and 10 denotes a hand-lever fixed to said shaft for conveniently manipulating the valve.

12 denotes the steam piston-rod, the outer end of which is fixed to the cross-head 13, and 14 14 represent the piston-rods of the oil-cylinders, also fixed to the cross-head on opposite sides of and in the same horizontal plane with the steam piston-rod.

15 15 represent the parallel cylindrical guide-rods on which the cross-head reciprocates, and their inner ends are fixed in the integral web connecting the cylinders and their outer ends in the vertical lugs 16 16 of the inclined arm 17, formed integral with the bracket 2.

18 denotes a horizontal bar fixed at its inner end to the front face of the cylinder-casting, and its outer end is turned downwardly and is secured to the arm 17, and 19 denotes an adjustable scale secured to the upper face of said bar, while 20 represents a gage or pointer traversing said scale, and it is formed on the upper end of a vertical arm 21, fixed to a cross-head 22, having a reciprocating movement on the outer ends of the fixed guide-rods 15 15.

23 24 denote a pair of differential pawls fulcrumed to the under side of the cross-head 22, which alternately engage the teeth on the ratchet-plate 24′, adjustably secured to the arm 17 by the retaining-bolts 25 and the adjusting-screw 26.

27 represents a yoke extending outward from the cross-head 22, and it is pivoted by a bolt 28 to a hand-lever 29, fulcrumed at its lower end to the strap 30, pivoted to the arm 17.

31 denotes a vertical guide-socket formed integral with the yoke 27, and 32 denotes a vertical bar reciprocating in said guide-socket, its lower end being turned horizontally inward to form the arm 33, which extends through a groove 34, formed in the ratchet-plate 24′ and beneath the free ends of the pawls. The upper end of the bar 32 is threaded to receive the bifurcated jaw 35, which extends on each side of the lever 29, and 36 represents a hand-grip pivoted to the upper end of the hand-lever 29, and a connecting-rod 37 extends from grip 36 to the jaw 35, so that when the grip is drawn in parallel with the handle the arm 33 raises the pawls 23 24, and when these are released the cross-head 22 may be moved in or out on the guide-rods, the exact distance to which it is set being determined by the gage 20, and as this cross-head 22 forms the limit-stop for the outward movement of the cross-head 13 and as the lock-nuts 38 39 on the inner ends of the guide-rods limit the play of the cross-head in the opposite direction the length of stroke or travel of the head 13 can be regulated to the fraction of an inch.

40 denotes a longitudinal shaft which operates the knees, (not shown,) and 41 denotes the ratchet-wheels by means of which said shaft is intermittently rotated. A counter-shaft 42 is journaled in the bearings 43 in the casting 2, and it is provided with the rocking arms 44, carrying the pawls 45, which actuate the ratchet-wheels 41.

47 and 48 denote vertical arms rigidly fixed to said counter-shaft, and their upper disk-shaped ends 49 extend into the grooves 50 50, formed in the opposite ends of the cross-head 13, so that by the mechanism just described the movement of the cross-head is communicated to the knees.

Referring to Fig. 6, 51 represents the piston on the rod 14, and 52 denotes a pipe extending from one end of the oil-cylinder to the other, so that when steam is admitted to one end of the steam-cylinder the movement of the steam-piston is communicated to the oil-cylinder pistons through the medium of the cross-head 13, the oil in the cylinder being forced from one end of the oil-cylinders to the other through the connecting-pipe, and by means of the valve 53 the passage of the oil is regulated so as to control the movement of the steam-piston and cross-head 13, the oil acting as a cushion or buffer, which prevents all tendency to irregular or jerking movement of the cross-head, but, on the contrary, insures a perfectly uniform, regular, and steady movement of the knees.

The operation of the device is very simple and under perfect control at all times, one move being all that is required to manipulate it, for with one hand on the lever 29 one can instantly regulate the thickness of the boards and with the hand on the lever 10 one can move the log the exact distance required and which is predetermined by the movement of the cross-head 13.

Having thus fully described our invention, what we claim as new and useful, and desire to secure by Letters Patent of the United States, is—

1. In a sawmill set-works, in combination, a bed or base, a motor-cylinder and guide-rods parallel with the axis thereof fixedly mounted upon the bed or base, a piston adapted to reciprocate in the cylinder, a cross-head sliding upon the guide-rods, a piston-rod connecting the piston and cross-head, a second cross-head sliding upon the guide-rods, means for locking such second cross-head in positions to which it may be adjusted, whereby the range of travel of the piston may be regulated, and mechanism actuated by the first-mentioned cross-head for intermittently advancing the knees.

2. In a sawmill set-works, in combination, a bed or base, a motor-cylinder and guide-rods parallel with the axis thereof fixedly mounted upon the bed or base, a piston adapted to reciprocate in the cylinder, a cross-head sliding upon the guide-rods, a piston-rod connecting the piston and cross-head, a second cross-head sliding upon the guide-rods, manually-controlled ratchet-and-pawl mechanism for locking such second cross-head in positions to which it may be adjusted, whereby the range of travel of the piston may be regulated, and mechanism actuated by the first-mentioned cross-head for intermittently advancing the knees.

3. In a sawmill set-works, in combination, a bed or base, a motor-cylinder and guide-rods parallel with the axis thereof fixedly mounted upon the bed or base, a piston adapted to reciprocate in the cylinder, a cross-head sliding upon the guide-rods, a piston-rod connecting the piston and cross-head, a second cross-head sliding upon the guide-rods, means for locking such second cross-head in positions to which it may be adjusted, whereby the range of travel of the piston may be regulated, means for retarding the movement of the first-mentioned cross-head, and mechanism actuated by the first-mentioned cross-head for intermittently advancing the knees.

4. In a sawmill set-works, in combination, a bed or base, a motor-cylinder and guide-rods parallel with the axis thereof fixedly mounted upon the bed or base, a piston adapted to reciprocate in the cylinder, a cross-head sliding upon the guide-rods, a piston-rod connecting the piston and cross-head, a second cross-head sliding upon the guide-rods, means for locking such second cross-head in positions to which it may be adjusted, whereby the range of travel of the piston may be regulated, retarding-cylinders, as 5, 5, pistons reciprocating therein, and being connected with the first-mentioned cross-head, each of such cylinders, 5, 5, having a by-pass connecting its chambers at opposite sides of its piston, and mechanism actuated by the first-mentioned cross-head for intermittently advancing the knees.

MICHAEL CORRY.
RUBEN F. BARKER.

Witnesses:
E. A. LEE,
M. O. KOHLER.